United States Patent
Landers

(10) Patent No.: US 9,459,652 B1
(45) Date of Patent: Oct. 4, 2016

(54) VIRTUAL REFERENCE CLOCK FOR VIRTUAL MACHINES

(75) Inventor: Joseph A. Landers, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 1059 days.

(21) Appl. No.: 12/910,612

(22) Filed: Oct. 22, 2010

(51) Int. Cl.
*G06F 1/12* (2006.01)

(52) U.S. Cl.
CPC ...................................... *G06F 1/12* (2013.01)

(58) Field of Classification Search
USPC ................ 713/375, 400, 401, 500, 502, 600
See application file for complete search history.

(56) References Cited

U.S. PATENT DOCUMENTS

| | | | | |
|---|---|---|---|---|
| 5,923,618 | A * | 7/1999 | Nelson et al. .................. | 368/28 |
| 6,788,249 | B1 * | 9/2004 | Farmer et al. ........... | 342/357.62 |
| 7,084,810 | B2 * | 8/2006 | Kitatani ................... | 342/357.62 |
| 7,394,802 | B2 * | 7/2008 | Jun et al. ...................... | 370/350 |
| 7,870,411 | B2 * | 1/2011 | Fraser et al. .................. | 713/375 |
| 2003/0093705 | A1 * | 5/2003 | Kriz et al. .................... | 713/600 |
| 2006/0130059 | A1 * | 6/2006 | Bennett et al. .................... | 718/1 |
| 2006/0143617 | A1 * | 6/2006 | Knauerhase et al. ......... | 718/104 |
| 2008/0155299 | A1 * | 6/2008 | Vertes et al. .................. | 713/600 |
| 2009/0132846 | A1 * | 5/2009 | Song ............................ | 713/502 |
| 2009/0290596 | A1 * | 11/2009 | Sticht et al. .................. | 370/466 |
| 2010/0172455 | A1 * | 7/2010 | McShea ........................ | 375/362 |
| 2011/0047315 | A1 * | 2/2011 | De Dinechin et al. ........... | 711/6 |
| 2011/0252266 | A1 * | 10/2011 | Costa ............................ | 713/500 |
| 2012/0030495 | A1 * | 2/2012 | Chandhoke et al. ......... | 713/400 |

OTHER PUBLICATIONS

Mills, David, "Computer Network Time Synchronization: The Network Time Protocol", CRC Press, 2006.
Mills, David, "Network Time Protocol Version 4 Reference and Implementation Guide", NTP Working Group, Technical Report 06-6-1, 2006.
NIST, "IEEE Standard for a Precision Clock Synchronization Protocol for Networked Measurement and Control Systems", IEEE Instrumentation and Measurement Society, Sponsored by the Technical Committee on Sensor Technology (TC-9), IEEE Std 1588-2008 (Revision of IEEE Std 1588-2002), IEEE, 2008.
"IEEE 1588 Precise Time Protocol: The New Standard in Time Synchronization", http://www.symmetricom.com/resources/downloads/white-papers, Symmetricom Whitepaper, 2005.
"What Time Is It?", http://www.symmetricom.com/resources/downloads/white-papers, Cisco Whitepaper, 2007.
Clark, Thomas et al., "Low-cost, High Accuracy GPS Timing", ION GPS 2000 13th International Technical Meeting of the Satellite Division of the Institute of Navigation, 2000.
"OATS Reporting Technical Specifications", FINRA, Dec. 15, 2008.

(Continued)

*Primary Examiner* — Khanh Dang

(57) ABSTRACT

A virtual clock switch permits accurate transfer of reference time from a variety of different time sources, transforms the reference time representation into one of a collection of different formats, and makes the reference time available to guest operating system instances running as virtual machines. As a result, reference time accuracy is increased, security improved, and the opportunity for providing redundancy in the event of hardware or software failures. Also, the ability to morph time formats allows the concept to be applied to guest virtual machines without the need to modify the guest operating system.

19 Claims, 4 Drawing Sheets

(56) References Cited

OTHER PUBLICATIONS

"Department of Health and Human Services", Food and Drug Administration, 21 CFR Part II: Electronic Records; Electronic Signatures; Final Rule, Electronic Submissions; Establishment of Public Docket; Notice; Federal Register, vol. 62, No. 54, Mar. 20, 1997.

Marzullo, Keith A., "Maintaining the Time in a Distributed System: An Example of a Loosely-Coupled Distributed Service" Ph.D. Dissertation, Stanford University, Department of Electrical Engineering, pp. 1-47, Feb. 1984.

"Timekeeping in VMware Virtual Machines", VMware ESX 3.5, VMware, Inc., Whitepaper, pp. 1-27, 2008.

Lamport, Leslie, "Time, Clocks and the Ordering of Events in a Distributed System", Massachusetts Computer Associates, Inc., Communications of the ACM, vol. 21, No. 7, pp. 558-565, Jul. 1978.

Mills, David, "Simple Network Time Protocol (SNTP) Version 4 for IPv4, IPv6 and OSI", University of Delaware, Network Working Group, Request for Comments: 2030, Obsoletes: 1769, pp. 1-18, Oct. 1996.

Mills, David L., University of Delaware, Network Working Group, "Network Time Protocol (Version 3) Specification, Implementation and Analysis", Request for Comments: 1305, Mar. 1992.

Brauer, Henning, "OpenNTP", OpenConn, 2004.

"How to configure an authoritative time server in Windows Server", KB Article ID 816042, Last Review Nov. 22, 2010—Revision 11.0, Microsoft Corporation, 2007.

"User Guide for the Chrony Suite", http://chrony.tuxfamily.org/guide/chrony.html, 2009.

Tardis 2000, http://www.kaska.demon.co.uk/tardis.htm, 2009.

"Configuring Windows 2000 and Windows XP to Use NIST Time Servers", National Institute of Standards and Technology, Technology Administration, U.S. Department of Commerce, Physics Laboratory, 2002.

NTP Pool Project, http://www.pool.ntp.org, 2009.

"Network Time Synchronization: 5 Essential Elements", Symmetricom Whitepaper, pp. 1-4, 2009.

"LANTIME M200/WWVB: Compact NTP Time Server with Integrated WWVB Reference Clock", Meinberg Funkuhren, http://www.meinberg.de/english/products/lantime-m200-wwvb.htm, 2009.

"Loran-C Frequency Standard FS700—MHz LORAN-C frequency standard", Stanford Research Systems, http://www.thinksrs.com/products/FS700.htm, 2009.

"The CNS Clock II", Communication Navigation Surveillance Inc., http://www.cnssys.com/cnsclock/CNSClockll.php, 2009.

Auler, Leandro et al., "Adaptive Kalman Filter for Time Synchronization over Packet Switched Networks", An Heuristic Approach, COMSWARE IEEE, 2007.

W. J. Riley, Handbook of Frequency Stability Analysis, NIST Special Publication 1065, 2008.

8182 Netclock/2 Master Clock, Spectracom Corp, http://www.spectracomcorp.com/Products/RetiredProducts/8182NetClock2MasterClock/tabid/157/Defaultaspx, 2009.

TPRO-PC IRIG Timecode Reader/Generator, Spectracom Corp, http://www.spectracomcorp.com/Products/RetiredProducts/TPROPCTimecodeReaderGenerator/tabid/302/Default.aspx, 2009.

What Leap Seconds Are, How They are Implemented and their Future, FAQ of the NIST Time and Frequency Division, http://tf.nist.gov/general/leaps.htm, 2009.

When and what is the GPS week roll-over problem? (FAQ—Time) of the NPL, http://www.npl.co.uk/reference/faqs/when-and-what-is-the-gps-week-rollover-problem-%28faq-time%29, 2009.

Multi-channel GPS L1/L2 Production Test Simulator SPIRENT GSS7735, Spirent Federal Systems, Inc, http://spcprev.spirentcom.com/documents/3444.pdf, Aug. 2007.

Mills, David et al., Timestamp Capture Principles, http://www.eecis.udel.edu/~mills/stamp.html, 2009.

Cristian, Flaviu, "Probabilistic Clock Synchronization", Distributed Computing 3:146-158, 1989.

\* cited by examiner

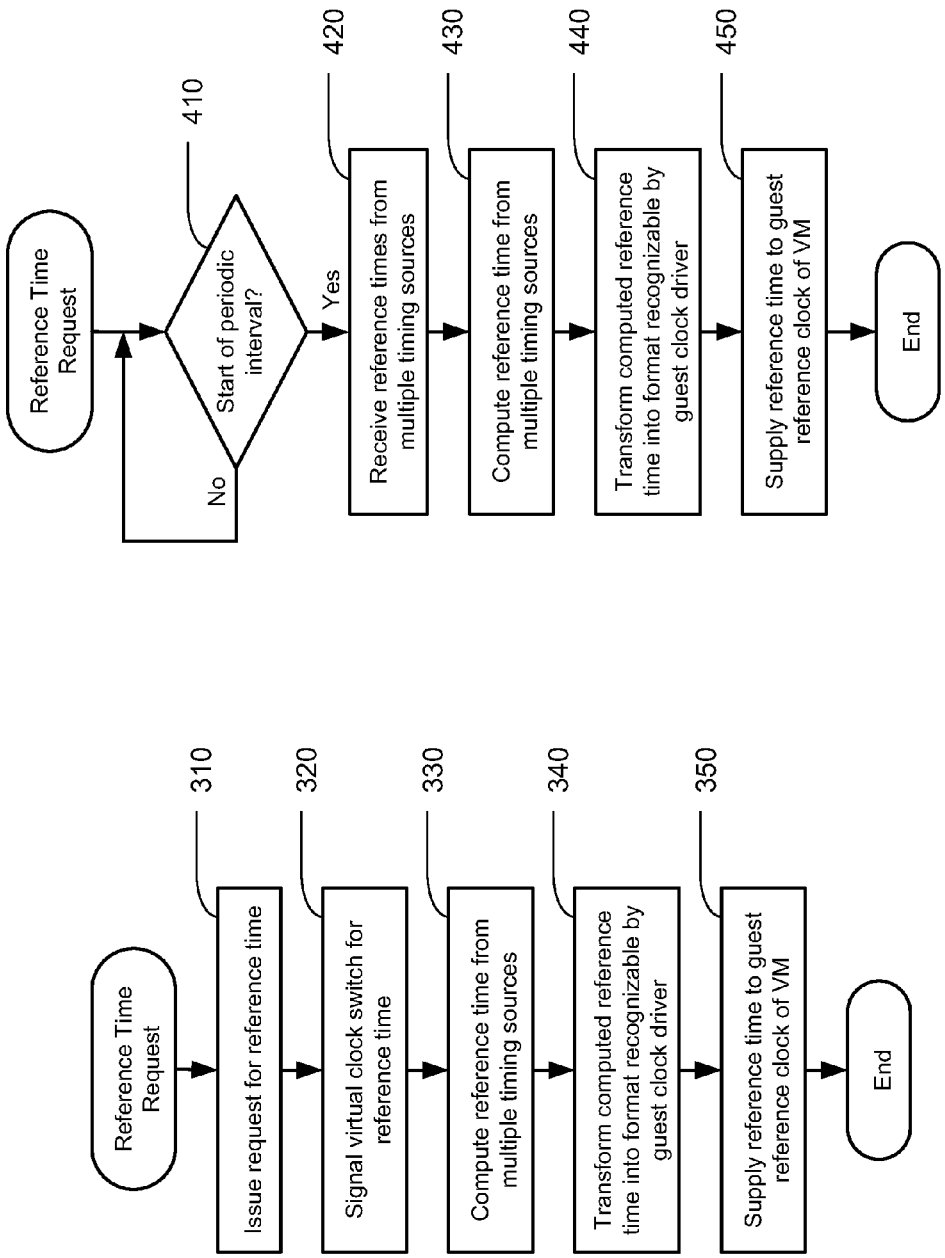

VIRTUAL REFERENCE CLOCK FOR VIRTUAL MACHINES

BACKGROUND

In a computer system, the synchronization of either real or virtual clocks to a reference time is an iterative and ongoing process as the computer system runs. Without synchronization updates on a periodic basis, time differences on the order of several seconds a day are common even on server class computer hardware in a temperature-controlled environment.

Official reference times originate from a common time scale in agreement with national laboratories around the world. Reference times are disseminated by telephone, long- and short-wave radio stations and a constellation of satellites in orbit around the earth. Computers connect to reference time sources via telephone modems or radio receivers. Often, these computers then distribute the reference time over a computer network via Network Time Protocol (NTP) or Precision Time Protocol (PTP). The transfer of time from one form to another and across computer networks introduces issues. From a mathematical standpoint, the transfer introduces delays and randomness. From a security standpoint, transferring time between systems introduces the opportunity for tampering and intentional error. From an implementation standpoint, connecting servers directly to reference time sources via a telephone modem or radio receiver is frequently not practical. Most radio clocks, for example, cost several thousand dollars and require an antenna with a clear view of the sky in order to compensate for the diurnal variation of the ionosphere and ensure accurate time transfer from primary time reference sources.

As a result of the difficulty and expense in obtaining reference time directly from a primary time synchronization reference, most sites simply rely on the reference time provided by a network of servers available over the internet. While convenient, the ad-hoc nature of this solution puts compliance with government-mandated record keeping requirements at risk. Although NTP has the capability for secure time transfer, this feature can be difficult to configure and manage, and secure time transfer via NTP is only available from a few reference time providers today.

In virtual computing environments, accurate timekeeping challenges can be compounded due to the sensitivity of time synchronization algorithms to randomness. Since virtual machines on a single host generally share the same physical hardware, the random error introduced due to kernel scheduling latency and resource contention can lead to high clock jitter. A common algorithmic solution to correcting large amounts of accumulated jitter is to directly step the clock to the reference time. Unfortunately, this solution can lead to a breakdown in the "happens before" relationship that is the foundation of many distributed computing algorithms. As a result, the overall stability and reliability of the entire virtual environment could be compromised if the system software has not been carefully coded and tested.

SUMMARY

One or more embodiments of the invention provide a virtual clock switch in a virtual computing environment. The virtual clock switch permits accurate reference time transfer from a variety of different sources, transforms the time representation into one of a collection of different formats, and makes the reference time available to guest operating system instances running as virtual machines. As a result, embodiments of the invention offer increased reference time accuracy, improved security, and the opportunity for providing redundancy in the event of hardware or software failures. Also, the ability to morph time formats allows the concept to be applied to guest virtual machines without the need to modify the guest operating system.

A method of supplying reference time to a guest operating system of a virtual machine, according to an embodiment of the invention, includes the steps of receiving a reference time request from the guest operating system, and in response to the reference time request from the guest operating system, generating a reference time from multiple reference times received from different timing sources, transforming the reference time into a format suitable for the guest operating system, and supplying the transformed reference time to the guest operating system. The method may further include the steps of computing a latency in generating and supplying the reference time to the guest operating system, and adjusting the reference time using the computed latency.

A method of supplying reference time to guest operating systems of virtual machines, according to an embodiment of the invention, includes the steps of generating a reference time from multiple reference times received from different timing sources, transforming the reference time into a first form that can be recognized by a clock driver of a guest operating system of a first virtual machine, transforming the reference time into a second form that can be recognized by a clock driver of a guest operating system of a second virtual machine, and supplying the reference time to the guest operating systems of the first and second virtual machines.

A computer system according to an embodiment of the invention includes a memory, a local clock, and a processing unit programmed with virtual machines with guest operating systems each having a guest reference clock, physical clock drivers, a virtual clock switch module for generating a reference time from reference times received through the physical clock drivers or a reference time received from the local clock, and virtual reference clock modules, each one of which is dedicated to one of the guest operating systems for supplying a reference time from the virtual clock switch to the respective guest operating system.

Other embodiments include, without limitation, a non-transitory computer-readable storage medium that includes instructions that enable a processing unit to implement one or more aspects of the disclosed methods as well as a system configured to implement one or more aspects of the disclosed methods.

BRIEF DESCRIPTION OF THE DRAWINGS

FIG. 3 is a flow diagram that illustrates the method for supplying a reference time to a virtual machine, according to an embodiment of the invention.

FIG. 4 is a flow diagram that illustrates the method for supplying a reference time to a virtual machine, according to another embodiment of the invention.

DETAILED DESCRIPTION

Figure 1:
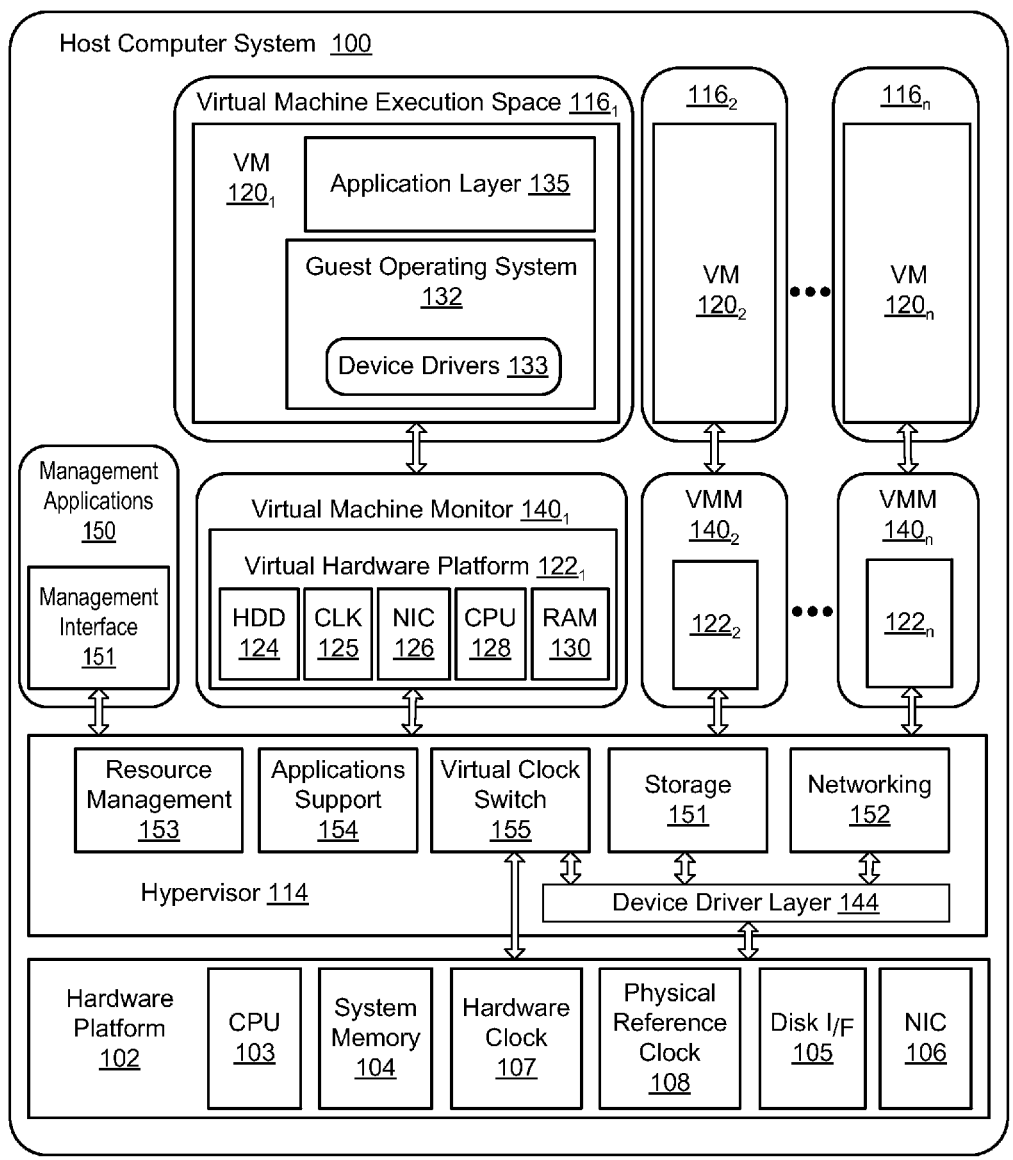
FIG. 1 depicts a block diagram of a virtualized computer system in which one or more embodiments of the invention may be practiced.

FIG. 1 depicts a block diagram of a virtualized computer system in which one or more embodiments of the invention may be practiced. Host computer system 100 may be constructed on a desktop, laptop or server grade hardware platform 102 such as an x86 architecture platform. Hardware platform 102 includes one or more CPUs 103, system memory 104, a disk interface 105, a network interface card (NIC) 106, a hardware clock 107, a physical reference clock 108, and other I/O devices such as, for example and without limitation, a mouse and keyboard (not shown in FIG. 1). Hardware clock 107 represents one or more devices for counting at a determined rate that can be used to mark the passage of time. On x86 architectures, this may correspond to the time stamp counter supplied by CPU 103. Physical reference clock 108 represents one or more devices capable of reading or obtaining a reference time and converting it into a format that can be used by other components of host computer system 100.

A hypervisor 114 is installed on top of hardware platform 102. Hypervisor 114 supports multiple virtual machine execution spaces $116_1$-$116_n$, within each of which a VM process may be executed to instantiate corresponding VMs $120_1$-$120_n$. For each of VMs $120_1$-$120_n$, hypervisor 114 manages a corresponding virtual hardware platform (i.e., virtual hardware platforms $122_1$-$122_n$) that includes emulated hardware such as virtual hard drive 124, virtual reference clock (CLK) 125, virtual NIC 126, one or more virtual CPUs 128, and guest physical RAM 130 for VM $120_1$. For example, virtual hardware platform $122_1$ may function as an equivalent of a standard x86 hardware architecture such that any x86 supported operating system, e.g., Microsoft Windows®, Linux®, Solaris® x86, NetWare, FreeBSD, etc., may be installed as guest operating system 132 to execute any supported application in application layer 135 for VM $120_1$. Device drivers 133 in guest operating system 132 of VM $120_1$ include device drivers that interact with emulated devices in virtual hardware platform $122_1$ as if such emulated devices were the actual physical devices. Device drivers 133 include a driver for a guest reference clock that serves as the operating system clock for VM $120_1$. The driver for the guest reference clock interacts with virtual reference clock 125 to obtain reference time. Hypervisor 114 is responsible for taking requests from device drivers 133 and translating the requests into corresponding requests for real device drivers in device driver layer 144 of hypervisor 114. The device drivers in device driver layer 144 then communicate with real devices in hardware platform 102.

Hypervisor 114 further includes a resource management module 153, which identifies components of hypervisor 114 that are responsible for scheduling and organizing the interaction of kernel and hardware resources, and an applications support module 154, which identifies components of hypervisor 114 that support user-level accesses to kernel resources. This module enforces a level of separation between untrusted user-level applications and hypervisor 114. Storage module 151 represents the storage stack of hypervisor 114, and includes the file system layer and components that support network and distributed file system access. Networking module 152 represents the network stack of hypervisor 114, and includes the networking virtual switch as well the layers necessary for sending and receiving data over physical or virtual circuits.

Virtual clock switch 155 is also a part of hypervisor 114. It allows for the control, selection and translation of time between hardware devices and time distributed across various components of host computer system 100 including hypervisor 114 and any number of instances of virtual machine execution space 116. Management applications 150 include one or more user-level applications that are interfaced to hypervisor 114 through management interface 151 to allow for the configuration, control, and monitoring of virtual clock switch 155.

It should be recognized that the various terms, layers and categorizations used to describe the virtualization components in FIG. 1 may be referred to differently without departing from their functionality or the spirit or scope of the invention. For example, virtual hardware platforms $122_1$-$122_N$ may be considered to be part of virtual machine monitors (VMM) $140_1$-$140_N$ which implement the virtual system support needed to coordinate operations between hypervisor 114 and their respective VMs. Alternatively, virtual hardware platforms $122_1$-$122_N$ may also be considered to be separate from VMMs $140_1$-$140_N$, and VMMs $140_1$-$140_N$ may be considered to be separate from hypervisor 114. One example of hypervisor 114 that may be used is included as a component of VMware's ESX™ product, which is commercially available from VMware, Inc. of Palo Alto, Calif. It should further be recognized that other virtualized computer systems are contemplated, such as hosted virtual machine systems, where the hypervisor is implemented in conjunction with a host operating system.

Figure 2:
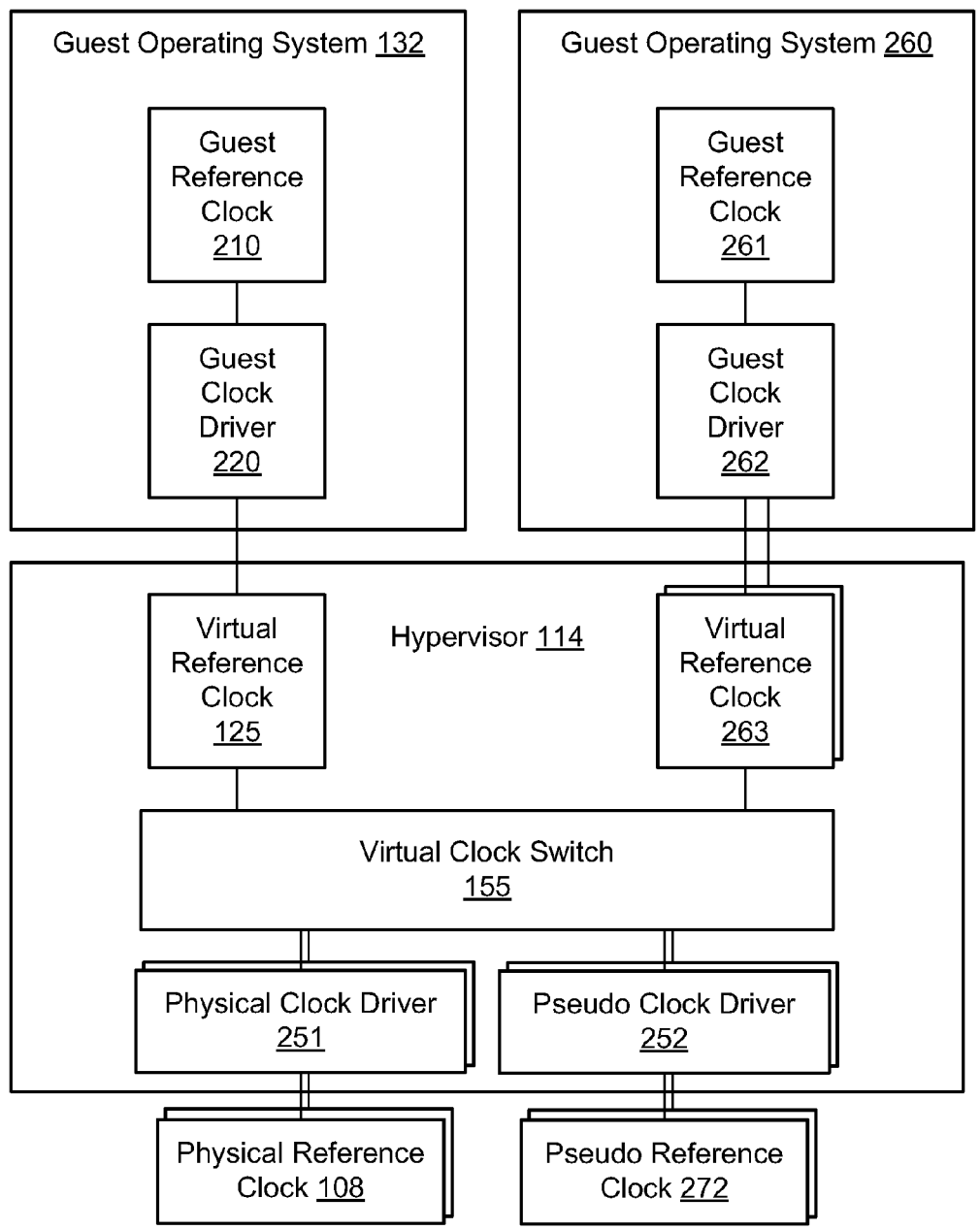
FIG. 2 is a conceptual illustration of the software components or modules that are used in supplying an operating system of a virtual machine with the reference time.

FIG. 2 is a conceptual illustration of software components or modules in host computer system 100 that supply an operating system of a virtual machine, e.g., guest operating system 132 of VM $120_1$ or guest operating system 260 of VM $120_2$, with the reference time. The software components include a guest clock device driver 220/262, a virtual reference clock 125/263, a virtual clock switch 155, one or more physical clock drivers 251, each coupled to physical reference clock 108, and one or more pseudo clock drivers 252, each coupled to a pseudo reference clock 272. Virtual clock switch 155 combines results of multiple reference time sources and distributes the reference time to any number of guest operating systems running in virtual machines. In the embodiment illustrated in FIG. 2, virtual clock switch 155 distributes the reference time to virtual reference clocks 125, 263, and the reference time is supplied from there to the guest reference clocks 210, 261 of operating systems 132, 260 through respective guest clock drivers 220, 262. Although not illustrated, it is to be understood that virtual clock switch 155 distributes the reference time to operating systems of any other virtual machines running in host computer system 100.

A number of advantages are realized with the configuration illustrated in FIG. 2. First, abstracting the propagation of reference time in the manner illustrated permits a wider sharing of expensive local reference clock hardware sources when they are available. Second, since the changes required by this approach operate entirely within hypervisor 114, it improves the secure dissemination of reference time between a reference clock and the virtual machines. Third, this approach makes it possible to provide reference time redundancy in the event of partial hardware or software failures.

Virtual clock switch 155 receives the reference time from one or more physical reference clocks 108 through one or more physical clock drivers 251 and from one or more pseudo reference clocks 272 through one or more pseudo clock drivers 252, and produces a single reference time output based on the reference time received from the different timing sources. Algorithms for generating a single reference time from multiple reference times are well known in the art and any one of these algorithms may be used here.

Physical reference clock 108, as described above, is a hardware component capable of reading or obtaining a reference time and converting it into a format that can be used by components of host computer system 100 at the hardware level. An example of such a device is a long- or short-wave radio receiver, GPS radio receiver, or computer modem constructed to monitor official reference times distributed by government and industry sponsored research laboratories around the world. Physical clock drivers 251 are software components capable of decoding the signals generated by the physical reference clocks 271 and making the reference time and associated parameters available to software running in hypervisor 114. Generally, there is one physical clock driver 251 for each physical reference clock 271, although this is not required. For example, a physical reference clock may be capable of providing both a reference time as a string on a serial port as well as a digital pulse coordinated with the reference time second epoch. Although both sources of reference time information come from a single physical reference clock, two different physical reference clock drivers may be used to discern the reference time. Additional examples of physical reference clocks 271 are timing modules that are based on high-precision free running oscillators.

Pseudo clock drivers 252 are software components capable of taking reference times from pseudo reference clocks 272 and providing them to virtual clock switch 155. The reference time might be the time indicated by host computer 100 itself. That is, the local clock of the host computer 100 that is not disciplined to an external reference time source corresponds to pseudo reference clock 272. The local clock can be used as a zero-cost time reference in configurations of independent server islands where inter-VM time accuracy is needed, but global reference time accuracy is not. This capability also may be used during development and testing of the virtual clock switch before an expensive hardware reference clock gets deployed. Furthermore, this clock may be used during periods when the external reference clocks lose connectivity due to maintenance or communications disruptions, increasing redundancy although at the cost of reduced accuracy.

Virtual clock switch 155 is a software component which transforms the data obtained via physical clock drivers 251 and/or pseudo clock drivers 252, and outputs a single reference time to one or more virtual reference clocks (e.g., virtual reference clocks 125, 263). The benefits of employing multiple input data streams include load balancing among driver and physical hardware paths as well as redundancy in the event of either software or hardware failures. Also, since the reference time should be substantially similar among clock sources, the availability of multiple sources adds a native capability for checking for outliers. Thus, it makes the comparison of the reference times from multiple sources straightforward and computationally easier. In one embodiment, the technique for producing a single reference time from multiple clock sources include combining and selecting the best estimate of the reference time using algorithms such as Adaptive Kalman Filtering and the feedback control system phase locked loops (PLL) and frequency locked loops (FLL). This capability allows the automatic selection of the best time sources, even if the reference time sources have differing phase noise characteristics. In another embodiment, the virtual clock switch is programmed to switch over to pseudo-clock drivers 252 when the physical clock drivers 251 become unavailable such as during communications disruptions with the external reference clocks or by an operator setting such as during maintenance or testing.

The virtual reference clock (e.g., virtual reference clock 125 or virtual reference clock 263) is a software component that is capable of transforming the reference time obtained from the virtual clock switch 155 into a format suitable for the guest operating system, in particular the guest clock driver of the guest operating system, to which it is supplying the reference time. For example, because the clock disciplining algorithms incorporated into guest operating systems may only support a subset of real hardware on the market, the virtual reference clock can be used to automatically transform the physical hardware's reference time into a format that the virtual guest operating system can handle. This is a valuable feature when moving physical servers into a virtual environment because many versatile and high quality reference hardware clocks are no longer manufactured but some guest operating systems and user environments still depend on their availability. An additional benefit of the virtual reference clock in a virtual environment is the capability of the virtual reference clock to simulate a variety of uncommon timekeeping events such as leap second insertion or the GPS week roll-over problem. Due to the complex nature of the propagation of the reference time, these types of events are usually only simulated under advanced laboratory conditions using expensive hardware. Such testing is needed to ensure the stability and integrity of systems and components in the response to anomalous timekeeping events.

The implementation of the virtual reference clock is not limited to a single instance. In some embodiments, multiple virtual reference clocks are provided to handle different time formats, timing events, and error simulations. Thus, a guest operating system can use whatever reference time management capabilities are available in indentifying and handling these events. In FIG. 2, a single instance of virtual reference clock 125 is illustrated and multiple instances of virtual reference clock 263 are illustrated.

The guest clock driver (e.g., guest clock driver 220 or guest clock driver 262) is a software component that provides the reference time and support information to the guest operating system via a virtual hardware interface. This representation may be done as a virtual serial or audio device. In one embodiment, the guest clock driver operates in either polled or non-polled mode. In a polled mode, the guest clock driver periodically samples the reference time presented by the virtual reference clock. In a non-polled mode, the guest clock driver raises an interrupt for recognition by the guest operating system periodically. This is typically done on virtual serial ports by toggling the DCD (Data Carrier Detect) line. Code implementing the guest reference clock detects this change at the user level and uses this as an indicator that new reference time data is available. Since hypervisor 114 is responsible for feeding the guest with virtual timer interrupts, the timestamp presented to the guest clock driver may be automatically adjusted to account for the latencies in the virtual reference clock, through the virtual clock switch and down to the physical clock drivers and the pseudo clock drivers. Additional accuracy is possible in a virtual environment using the techniques known in the art, which include provisions for accounting of the delays in processing the reference time.

The guest reference clock (e.g., guest reference clock 210 or guest reference clock 261) is a software component that uses the guest clock driver to obtain the reference time and make it available to the guest operating system running in a virtual machine. One advantage of using the guest reference clock as a built-in component is that no guest specific changes are necessary to provide an accurate time reference to the guest kernel and associated applications.

FIG. 3 is a flow diagram that illustrates the method for supplying a reference time to a virtual machine, according to an embodiment of the invention. The steps of this method will be described with reference to the software components illustrated in FIG. 2.

The method begins when a VM requests a reference time. In step 310, the guest operating system issues this request using the guest clock driver (step 310). In step 320, the virtual reference clock receives this request and signals the virtual clock switch for the reference time. In step 330, the virtual clock switch computes a reference time from a plurality of timing sources in the manner described above. In step 340, the reference time is supplied to the virtual reference clock, which transforms the reference time into a format recognizable by the guest clock driver. In step 350, the transformed reference time is supplied to the guest driver and then to the guest reference clock of the virtual machine. In embodiments where there are more than one virtual reference clock connected to the virtual clock switch, as in FIG. 2, the virtual clock switch generates a reference time and supplies it to the virtual reference clock making the request.

FIG. 4 is a flow diagram that illustrates the method for supplying a reference time to a virtual machine, according to another embodiment of the invention. The steps of this method will be described with reference to the software components illustrated in FIG. 2. In this method, at periodic intervals, reference time is computed from multiple timing sources by the virtual clock switch and propagated up to the guest reference clock of the virtual machine.

The method begins at the start of one of the periodic intervals (step 410). In step 420, the virtual clock switch receives reference times from multiple timing sources and computes a reference time from a plurality of timing sources in the manner described above. In step 430, the virtual clock switch produces a reference time from a plurality of timing sources in the manner described above. In step 440, the reference time is supplied to the virtual reference clock, which transforms the reference time into a format recognizable by the guest clock driver. In embodiments where there are more than one virtual reference clock connected to the virtual clock switch, as in FIG. 2, the reference time is supplied to the multiple virtual reference clocks, which transform the reference time into a format recognizable by the guest clock driver to which it is connected. In step 450, the transformed reference time is supplied to the guest driver and then to the guest reference clock of the virtual machine.

Figure 5:
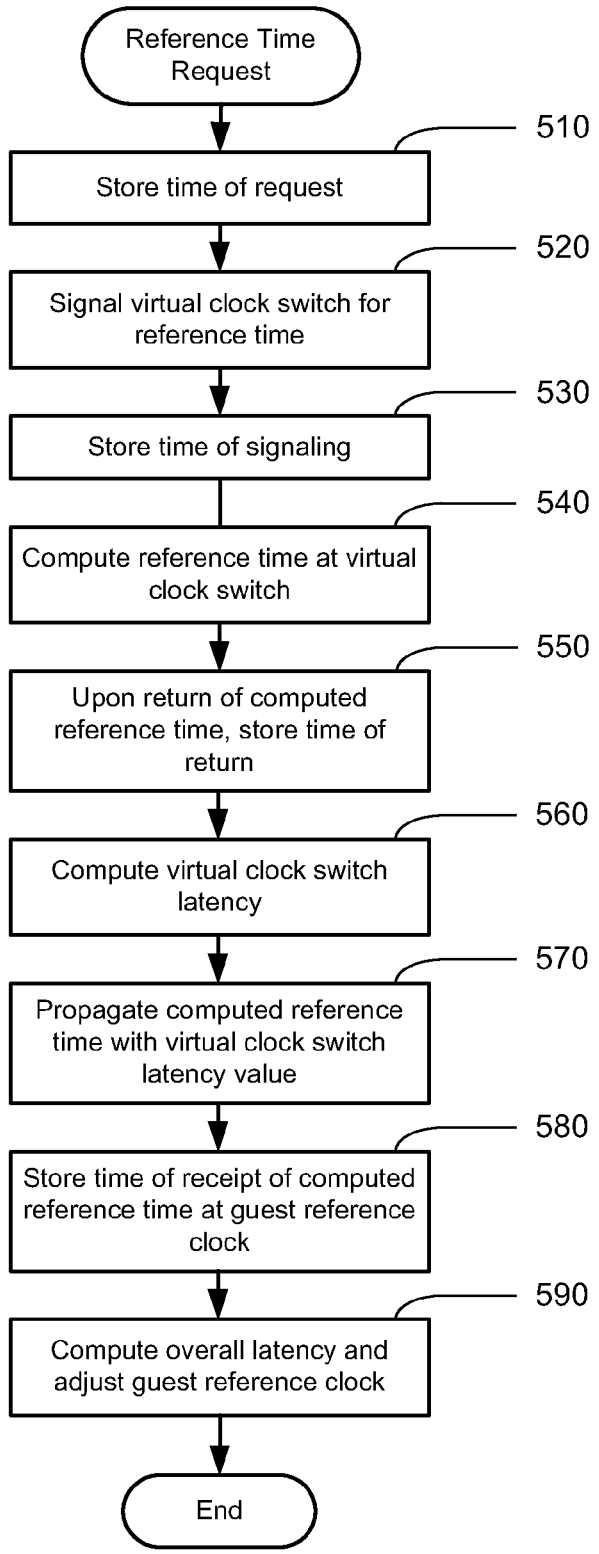
FIG. 5 is a flow diagram that illustrates the method for estimating a latency associated with a reference time supplied to a virtual machine.

FIG. 5 is a flow diagram that illustrates the method for estimating a latency associated with a reference time supplied to a virtual machine. The steps of this method will be described with reference to the software components illustrated in FIG. 2. This latency represents the delay in propagating the reference time from the multiple clock sources to the guest reference clock and thus the difference in the reference time produced by the virtual clock switch and the actual time when the reference time is propagated to the guest reference clock.

In step 510, the guest reference clock issues a request for a reference time from the virtual reference clock through the guest clock driver, and stores the time of the request based on its local time. In step 520, the virtual reference clock receives the request from the guest clock driver and signals the virtual clock switch for the reference time. In step 530, the virtual reference clock stores the time of this signaling. In step 540, the reference time is computed by the virtual clock switch and returned to the virtual reference clock. Upon return of the computed reference time, the virtual reference clock stores the time of this return (step 550), and computes the latency through the virtual clock switch and the multiple timing sources as the difference between the time of the signaling and the time of the return (step 560). In step 570, the virtual reference clock propagates the reference time (along with the latency value) to the guest clock driver and then to the guest reference clock. In step 580, the guest reference clock stores the time of the receipt of the reference time based on its local time, and computes the latency through the guest clock driver and the virtual reference clock as: [(the difference between the time of the request and the time of the receipt)−(the latency through the virtual clock switch and the multiple timing sources)] divided by two. In step 590, the reference time received at the guest reference clock is adjusted in the following manner to account for these latencies: adjusted reference time=received reference time−(latency through the guest clock driver and the virtual reference clock)−(the latency through the virtual clock switch and the multiple timing sources). In one or more embodiments of the invention where the reference time reference time is computed from multiple timing sources by the virtual clock switch at periodic intervals and propagated up to the guest reference clocks of different virtual machines, the latency through the virtual clock switch and the multiple timing sources is propagated to the guest reference clocks along with the reference time. The guest reference clocks adjust the reference time based on this latency. In an alternative embodiment, the virtual clock switches adjust the reference time based on this latency and propagate the adjusted reference time to the guest reference clocks.

Other methods for adjusting the guest reference clock may be used in alternative embodiments of the present invention. In one alternative embodiment, the guest reference clock is adjusted with respect to the virtual reference clock in accordance with the algorithm described in D. Mills, "Simple Network Time Protocol (SNTP) Version 4 for IPv4, IPv6 and OSI," Network Working Group, Request for Comments: 2030, University of Delaware (October 1996), the entire contents of which are incorporated by reference herein. In another alternative embodiment, the guest reference clock is adjusted with respect to the virtual reference clock in accordance with the algorithm described in F. Cristian, "Probabilistic Clock Synchronization," *Distributed Computing*, Springer, Vol. 3, No. 3, pp. 146-158 (1989), the entire contents of which are incorporated by reference herein.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. In a host computer having virtual machines with guest operating systems instantiated therein, a method of supplying reference time to the guest operating systems, comprising:
receiving at a virtual reference clock a reference time request from a first guest operating system; and
in response to the reference time request from said first guest operating system:
sending, by the virtual reference clock, a request to a virtual clock switch to generate a first reference time, the virtual reference clock saving a time at which the request to the virtual clock switch is sent;
receiving at the virtual reference clock a first reference time, the first reference time being generated by the virtual clock switch from multiple reference times received from different timing sources, the virtual reference clock saving a time at which the first reference time is received from the virtual clock switch;
computing at the virtual reference clock a first latency value based on the times that the virtual reference clock requests and receives the first reference time;
transforming at the virtual reference clock the first reference time from a format that is incompatible with a clock driver of the first guest operating system into a format that is compatible with said clock driver of the first guest operating system; and
supplying, by the virtual reference clock, the transformed first reference time and the first latency value to the first guest operating system.

2. The method according to claim 1, further comprising:
computing an overall latency in generating and supplying the first reference time to the first guest operating system; and
adjusting the first reference time using the overall latency.

3. The method according to claim 2, wherein the overall latency is computed based in part on the latency in generating the first reference time, as computed.

4. The method according to claim 1, further comprising:
receiving a reference time request from a second guest operating system; and
in response to the reference time request from said second guest operating system, generating a second reference time from multiple reference times received from different timing sources and supplying the second reference time to the second guest operating system, wherein the first reference time and the second reference time are different.

5. The method according to claim 1, wherein the different timing sources include more than one physical reference clock.

6. The method according to claim 1, wherein the different timing sources include a local clock of the host computer system.

7. In a host computer having virtual machines with guest operating systems including first and second guest operating systems instantiated therein, a method of supplying reference time to the guest operating systems, comprising:
receiving, from a virtual reference clock, a request for a reference time;

receiving, at the virtual reference clock, a reference time, the first reference time being generated by the virtual clock switch in a first form from multiple reference times received from different timing sources, the virtual reference clock saving a time at which the first reference time is received from the virtual clock switch, wherein the first form cannot be recognized by respective clock drivers of the first and second guest operating systems;

computing, at the virtual reference clock, a latency value based on the times that the virtual reference clock requests and receives the reference time;

transforming, by the virtual reference clock, the reference time from the first form into a second form that can be recognized by the clock driver of the first guest operating system;

transforming the reference time from the first form into a third form that can be recognized by the clock driver of the second guest operating system; and supplying the transformed reference time in the second form and the latency value to the first and second guest operating system; and supplying the transformed reference time in the third form and the latency value to the second guest operating system.

8. The method according to claim 7, wherein the different timing sources include more than one physical reference clock.

9. The method according to claim 8, wherein the host computer has a physical clock driver for each of said more than one physical reference clock and the physical clock driver is not compatible with the first and second guest operating systems.

10. The method according to claim 8, wherein said more than one physical reference clock include a timing module having a high precision oscillator.

11. The method according to claim 7, wherein the different timing sources include a local clock of the host computer system.

12. The method according to claim 7, further comprising:
periodically polling for the reference time by the first and second guest operating systems,
wherein the reference time is supplied to the first and second guest operating systems in response to the periodically polling.

13. A computer system comprising:
a local clock configured in a hardware platform of a host computer; and
a processing unit configured in said hardware platform and programmed with:
virtual machines with guest operating systems, each of the guest operating systems including a guest reference clock;
physical clock drivers;
a virtual clock switch module for generating a reference time from reference times received through said physical clock drivers or a reference time received from the local clock; and
virtual reference clock modules, each one of which is dedicated to one of the guest operating systems for requesting a reference time from the virtual clock switch and supplying the reference time from the virtual clock switch and a latency value to the respective guest operating system,
wherein each of the virtual reference clock modules is configured to compute the latency value based on the times that each virtual reference clock module requests and receives the reference time from the virtual clock switch, and to transform the reference time from a form that cannot be recognized by a clock driver of the guest operating system associated therewith to a form that can be recognized by said clock driver of the guest operating system associated therewith.

14. The computer system according to claim 13, wherein each of the virtual reference clock modules is configured to adjust the reference time received from the virtual clock switch.

15. The computer system according to claim 14, wherein the adjustment of the reference time includes an adjustment to insert a leap second.

16. The computer system according to claim 14, wherein the adjustment of the reference time includes an adjustment to correct for GPS week rollover error.

17. The computer system according to claim 13, wherein the physical reference clocks include at least one of long- and short-wave radio receivers, GPS radio receiver, and computer modem configured to monitor official reference times distributed by government and industry sponsored research laboratories.

18. The computer system according to claim 17, wherein the virtual clock switch module is configured to receive the reference time from the local clock when the physical reference clocks become unavailable.

19. The computer system according to claim 13, wherein the physical clock drivers are coupled to a timing module having a high precision oscillator.

* * * * *